United States Patent
Nemeth et al.

(10) Patent No.: US 12,520,016 B2
(45) Date of Patent: Jan. 6, 2026

(54) CROSS-LAYER OPTIMIZATION FOR CONGESTION CONTROL AND TRAFFIC PRIORITIZATION IN RAN-AWARE XR AND XR-AWARE RAN

(71) Applicant: MediaTek Singapore Pte. Ltd., Singapore (SG)

(72) Inventors: Jozsef Gabor Nemeth, Cambridge (GB); Mohammed S Aleabe Al-Imari, Cambridge (GB); Abdellatif Salah, Cambridge (GB); Chia-Chun Hsu, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 155 days.

(21) Appl. No.: 18/695,528

(22) PCT Filed: Sep. 29, 2022

(86) PCT No.: PCT/CN2022/122659
§ 371 (c)(1),
(2) Date: Mar. 26, 2024

(87) PCT Pub. No.: WO2023/051709
PCT Pub. Date: Apr. 6, 2023

(65) Prior Publication Data
US 2024/0396846 A1   Nov. 28, 2024

Related U.S. Application Data

(60) Provisional application No. 63/250,280, filed on Sep. 30, 2021.

(51) Int. Cl.
*H04L 47/2416*   (2022.01)
*H04L 47/56*     (2022.01)
(Continued)

(52) U.S. Cl.
CPC ....... *H04N 21/816* (2013.01); *H04L 47/2416* (2013.01); *H04L 47/56* (2013.01);
(Continued)

(58) Field of Classification Search
CPC .............. H04N 21/816; H04N 21/6473; H04L 47/2416; H04L 47/56; H04W 28/0236; H04W 28/0268
See application file for complete search history.

(56) References Cited

U.S. PATENT DOCUMENTS

2019/0364492 A1   11/2019   Azizi et al.
2020/0336435 A1   10/2020   Zhang et al.
(Continued)

FOREIGN PATENT DOCUMENTS

CN   101179773 A   5/2008
WO   2020/011350 A1   1/2020
(Continued)

OTHER PUBLICATIONS

International Search Report and Written Opinion dated Dec. 15, 2022, issued in application No. PCT/CN2022/122659.
(Continued)

*Primary Examiner* — Nazia Naoreen
(74) *Attorney, Agent, or Firm* — McClure, Qualey & Rodack, LLP

(57) ABSTRACT

An application server side network predicts, based at least on a feedback of traffic latency, a congestion in a traffic between the application server side network and at least one user equipment (UE) of one or more UEs in a radio access network (RAN) of the application server side network based on a total RAN network load and traffics between the application server side network and the one or more UEs. The application server side network controls the congestion in response to an increase in a queueing delay in the traffic
(Continued)

between the application server side network and the at least one UE as well as an increase in a data rate and quality of service (QoS) parameters of the traffic, with the traffic including an extended reality (XR) traffic associated with an XR client-side application executed on the at least one UE.

20 Claims, 7 Drawing Sheets

(51) Int. Cl.
  *H04N 21/647*    (2011.01)
  *H04N 21/81*    (2011.01)
  *H04W 28/02*    (2009.01)
  *H04N 19/30*    (2014.01)

(52) U.S. Cl.
  CPC .... *H04N 21/6473* (2013.01); *H04W 28/0236* (2013.01); *H04W 28/0268* (2013.01); *H04N 19/30* (2014.11)

(56) References Cited

U.S. PATENT DOCUMENTS

| | | |
|---|---|---|
| 2020/0383004 A1 | 12/2020 | Hande et al. |
| 2021/0037250 A1 | 2/2021 | Makar |
| 2021/0400537 A1* | 12/2021 | Zhang ................ H04L 47/28 |

FOREIGN PATENT DOCUMENTS

| | | |
|---|---|---|
| WO | 2020/060984 A1 | 3/2020 |
| WO | 2021021550 A1 | 2/2021 |

OTHER PUBLICATIONS

Interdigital Inc.; "Discussion on potential enhancements for XR (R1-2107537);" 3GPP TSG RAN WG1 #106-e; Aug. 2021; pp. 1-6.
International Search Report and Written Opinion dated Nov. 30, 2022, issued in application No. PCT/CN2022/122659.
Qualcomm Incorporated; "Potential Enhancements for XR (R1-2104704;" 3GPP TSG RAN WG1 #105-e; May 2021; pp. 1-12.
Qualcomm Incorporated; "Potential Enhancements for XR (R1-2107377);" 3GPP TSG RAN WG1 #106-e; Aug. 2021; pp. 1-12.
Mediatek Inc; "Further Potential XR Enhancements (R1-2109556);" 3GPP TSG RAN WG1 Meeting #106bis-e; Oct. 2021; pp. 1-7.
Mediatek Inc; "Further Potential XR Enhancements (R1-2112299);" 3GPP TSG RAN WG1 Meeting #107-e; Nov. 2021; pp. 1-7.
VIVO; "Discussion on XR Applications, traffic model and evaluation methodologies (R1-2007698);" 3GPP TSG RAN WG1 #103-e; Nov. 2020; pp. 1-20.
Chinese language office action dated Jul. 21, 2023, issued in application No. TW 111137242.
Chinese language office action dated Feb. 5, 2024, issued in application No. TW 111137241.
3GPP TS 23.501 V17.2.0; "Technical Specification Group Services and System Aspects; System architecture for the 5G System(5GS); Stage 2 (Release17);" Sep. 2021; pp. 1-542.
3GPP TS 23.503 V17.2.0; "Technical Specification Group Services and System Aspects; Policy and charging control framework for the 5G System (5GS); Stage 2 (Release17);" Sep. 2021; pp. 1-141.
3GPP TR 26.928 V16.1.0; "Technical Specification Group Services and System Aspects; Extended Reality (XR) in 5G (Release 16);" Dec. 2020; pp. 1-131.
Extended European Search Report dated Mar. 10, 2025, issued in application No. EP 22875088.1.
Chiew, T-K., et al.; "Error-resilient low-delay H.264/802.11 transmission via cross-layer coding with feedback channel;" Visual Communications and Image Processing; Jul. 2005; pp. 1868-1879.

* cited by examiner

CROSS-LAYER OPTIMIZATION FOR CONGESTION CONTROL AND TRAFFIC PRIORITIZATION IN RAN-AWARE XR AND XR-AWARE RAN

CROSS REFERENCE TO RELATED PATENT APPLICATION(S)

The present disclosure is part of a non-provisional application claiming the priority benefit of U.S. Patent Application No. 63/250,280, filed 30 Sep. 2021, the content of which herein being incorporated by reference in its entirety.

TECHNICAL FIELD

The present disclosure is generally related to mobile communications and, more particularly, to methods and apparatus for cross-layer optimization for congestion control and traffic prioritization in radio access network (RAN)-aware extended reality (XR) and XR-aware RAN in mobile communications.

BACKGROUND

Unless otherwise indicated herein, approaches described in this section are not prior art to the claims listed below and are not admitted as prior art by inclusion in this section.

In wireless communications, such as mobile communications under the $3^{rd}$ Generation Partnership Project (3GPP) specification(s) for $5^{th}$ Generation (5G) New Radio (NR), further enhancements are required to ensure 5G support of latency-sensitive throughput-sensitive applications. One emerging trend is the rise of 5G applications for XR, which may include virtual reality (VR), augmented reality (AR) and mixed reality (MR). Coordination and sharing of information between an XR server, multi-access edge computing (MEC) and a RAN is required to further optimize end-to-end (E2E) performance including throughput, latency and reliability. However, there remain issues that need to be addressed for cross-layer optimization in a XR-aware RAN for a RAN-aware XR. Such issues include, for example, the need for optimization of congestion control and traffic prioritization.

Therefore, there is a need for a solution of cross-layer optimization for congestion control and traffic prioritization in RAN-aware XR and XR-aware RAN in mobile communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the issue(s) described herein. More specifically, various schemes proposed in the present disclosure are believed to provide solutions involving cross-layer optimization for congestion control and traffic prioritization in RAN-aware XR and XR-aware RAN in mobile communications. Under the various proposed schemes, congestion control in high-reliability and low-latency applications may rely on a feedback of traffic latency with traffic prioritization enhancements.

In one aspect, a method may involve an application server side network predicting, based at least on a feedback of traffic latency, a congestion in a traffic between the application server side network and at least one user equipment (UE) of one or more UEs in a RAN of the application server side network based on a total RAN network load and traffics between the application server side network and the one or more UEs. The method may also involve the application server side network controlling the congestion responsive to an increase in a queueing delay in the traffic between the application server side network and the at least one UE and an increase in a data rate and quality of service (QoS) parameters of the traffic. The traffic between the at least one UE and the application server side network may include an XR traffic associated with an XR client-side application executed on the at least one UE.

In another aspect, an apparatus implementable in an application server side network may include a transceiver and a processor coupled to the transceiver. The transceiver may be configured to communicate with one or more network nodes of the network. The processor may predict, based at least on a feedback of traffic latency, a congestion in a traffic between the application server side network and at least one UE of one or more UEs in a RAN of the application server side network based on a total RAN network load and traffics between the application server side network and the one or more UEs. The processor may also control, via the transceiver, the congestion responsive to an increase in a queueing delay in the traffic between the application server side network and the at least one UE and an increase in a data rate and QoS parameters of the traffic. The traffic between the at least one UE and the application server side network may include an XR traffic associated with an XR client-side application executed on the at least one UE.

It is noteworthy that, although description provided herein may be in the context of certain radio access technologies, networks and network topologies such as 5G/NR mobile communications, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, Internet-of-Things (IoT), Narrow Band Internet of Things (NB-IoT), Industrial Internet of Things (IIoT), vehicle-to-everything (V2X), and non-terrestrial network (NTN) communications. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to cross-layer optimization for congestion control and traffic prioritization in RAN-aware XR and XR-aware RAN in mobile communications. According to the present disclosure, a number of possible solutions may be implemented separately or jointly. That is, although these possible solutions may be described below separately, two or more of these possible solutions may be implemented in one combination or another.

Figure 1:
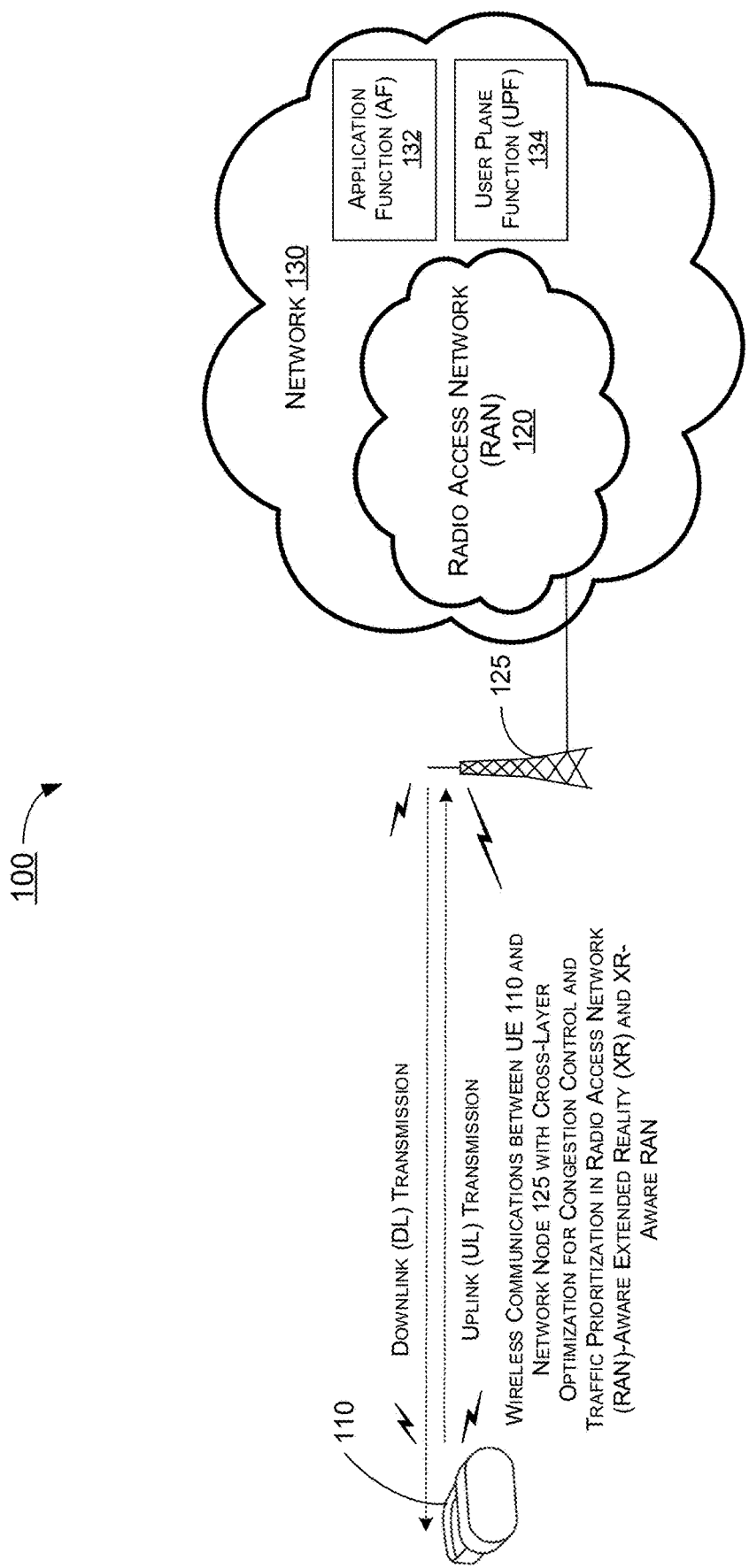
FIG. 1 is a diagram of an example network environment in which various proposed schemes in accordance with the present disclosure may be implemented.

FIG. 1 illustrates an example network environment 100 in which various solutions and schemes in accordance with the present disclosure may be implemented. FIG. 2~FIG. 7 illustrate examples of implementation of various proposed schemes in network environment 100 in accordance with the present disclosure. The following description of various proposed schemes is provided with reference to FIG. 1~FIG. 7.

Referring to FIG. 1, network environment 100 may involve a UE 110 in wireless communication with a RAN 120 (e.g., a 5G NR mobile network or another type of network such as an NTN). UE 110 may be in wireless communication with RAN 120 via a base station or network node 125 (e.g., an eNB, gNB or transmit-receive point (TRP)). RAN 120 may be a part of a network 130 which may also include an Application Function (AF) 132 and a User Plane Function (UPF) 134, among other functions described below. In network environment 100, UE 110 and network 130 (via network node 125 of RAN 120) may implement various schemes pertaining to cross-layer optimization for congestion control and traffic prioritization in RAN-aware XR and XR-aware RAN in mobile communications, as described below. It is noteworthy that, although various proposed schemes, options and approaches may be described individually below, in actual applications these proposed schemes, options and approaches may be implemented separately or jointly. That is, in some cases, each of one or more of the proposed schemes, options and approaches may be implemented individually or separately. In other cases, some or all of the proposed schemes, options and approaches may be implemented jointly.

Under a proposed scheme in accordance with the present disclosure, congestion control in high-reliability and low-latency applications may rely on a feedback of traffic latency. Fast and accurate feedback may be required for maximum capacity and quality of experience (QoE). This may involve architectural and algorithmic improvements to measurements, reporting and control. Under the proposed scheme, latency-(difference) over an Internet Protocol (IP) network and $5^{th}$ Generation System (5GS)/RAN may be measured separately for accurate and appropriate rate-and-latency adaptation for congestion control (instead of measured edge to edge measurements).

Figure 2:
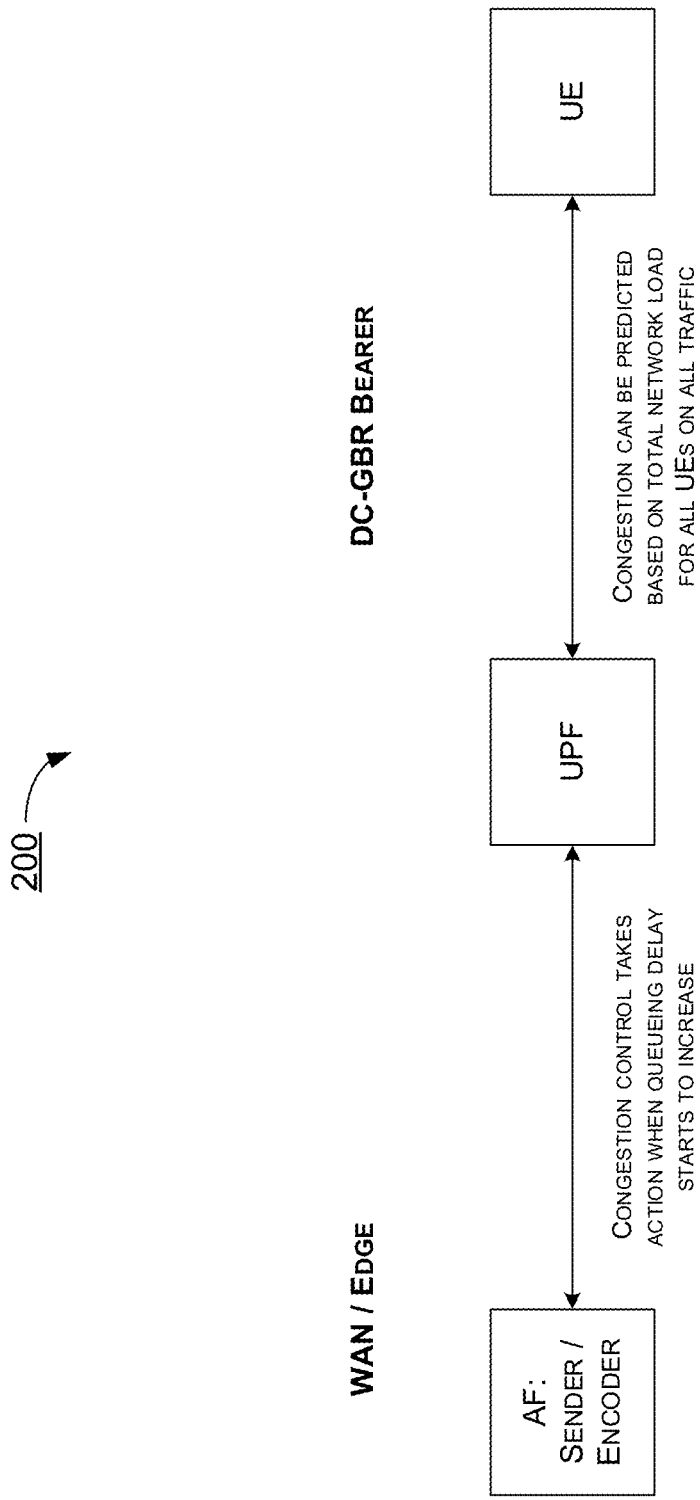
FIG. 2 is a diagram of an example scenario under a proposed scheme in accordance with the present disclosure.

FIG. 2 illustrates an example scenario 200 under a proposed scheme in accordance with the present disclosure with respect to measurement of AF-UPF delay (or difference therebetween). For instance, at UPF 134, an agent function (herein interchangeably referred to as "Agent") may measure each packet delay from Server to UPF in the downlink (DL) direction. Any additional delay over 5GS/RAN or the cumulative delay is measured by RAN 120 or UE 110. Distinction may be made between an initial transmission and retransmission(s). RAN 120 may predict congestion early on based on an overall traffic of all UEs (including UE 110) and any variations in the number of serviced links and their respective channel state information (CSI) and $5^{th}$ Generation QoS identifier (5QI) requirements as well as actual throughput. In scenario 200, congestion control may take action when queueing delay starts to increase. On the side of wide area network (WAN) or Edge, there may be no packet drop (no queue bloating with low bit error rate (BER)). The target maximum lag may be lower for the Edge than for Cloud. The congestion may be equal to the lag when it approaches the target maximum. On the side of delay-constrained guaranteed bit rate (DC-GBR), the deterministic maximum delay may be set by a model at a fixed lag. There may be no congestion (fixed lag with guaranteed bit rate). Regarding Adaptive QoS Policy (AQP) and QoS Notification Control (QNC), the frame error may grow or reduce until congestion control is activated. Delay violation may be equal to frame error. Between the UPF 134 and a UE (e.g., UE 110), the congestion may be predicted based on total network load for all UEs on all traffic (e.g., including enhanced Mobile Broadband (eMBB) traffic).

Figure 3:
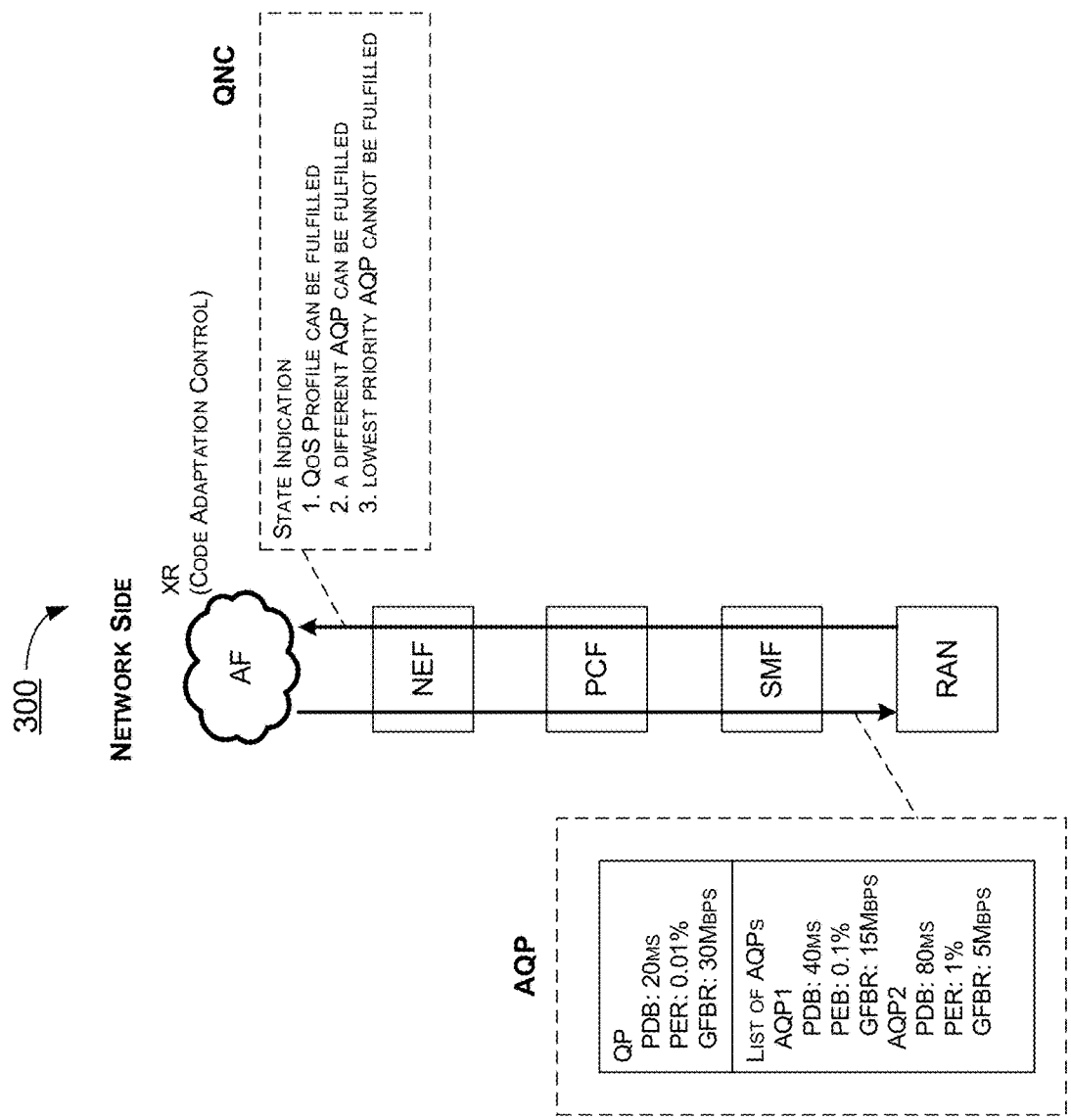
FIG. 3 is a diagram of an example scenario under a proposed scheme in accordance with the present disclosure.

FIG. 3 illustrates an example scenario 300 under a proposed scheme in accordance with the present disclosure with respect to extension of AQP and QNC to bundles of streams. In general, adaptive QoS control is based on a single stream and a worst-case packet delay budget (PDB). Meanwhile, a media stream may be most efficiently transmitted over multiple streams, and certain UEs may operate with soft-real-time requirements. Under the proposed scheme, a media stream transmitted over RAN 120 may be split into multiple QoS flows according to reliability and/or latency requirements. Moreover, QoS adaptation mechanisms of AQP/QNC may be extended to handling choices between bundles of simultaneous streams among the multiple QoS flows. In extending the QoS adaptation mechanisms, a soft-real-time delay constrained data bearer (DC-DBR) option may be utilized, which may specify the reliability requirements of two flows of the simultaneous QoS flows by two pairs of {reliability, latency}. In scenario 300, different priority queues may be utilized to support different reliability categories. For instance, quantization parameter (QP)=two QoS flows of {delay, packet error rate, bit rate}={10 ms, $1\times10^{-4}$, 30 Mbps} and {10 ms, $1\times10^{-6}$, 15 Mbps}, respectively, and so on for AQP. As for QNC, state information may be used for code adaptation control for XR and may indicate, for example and without limitation, (1) QoS profile can be fulfilled, (2) a different AQP can be fulfilled, and/or (3) the lowest priority AQP cannot be fulfilled. As shown in FIG. 3, on the network side, traffic in both the DL and uplink (UL) directions between a RAN (e.g., RAN 120) and an AF (e.g., an application server implementing AF 132) may traverse through several functions such as a Network Exposure Function (NEF), a Policy Charging Function (PCF), and a Session Management Function (SMF) of network 130. The AQP may be applied on traffic flowing from the AF to the RAN, and the QNC may be applied on traffic flowing from the RAN to the AF.

Figure 4:
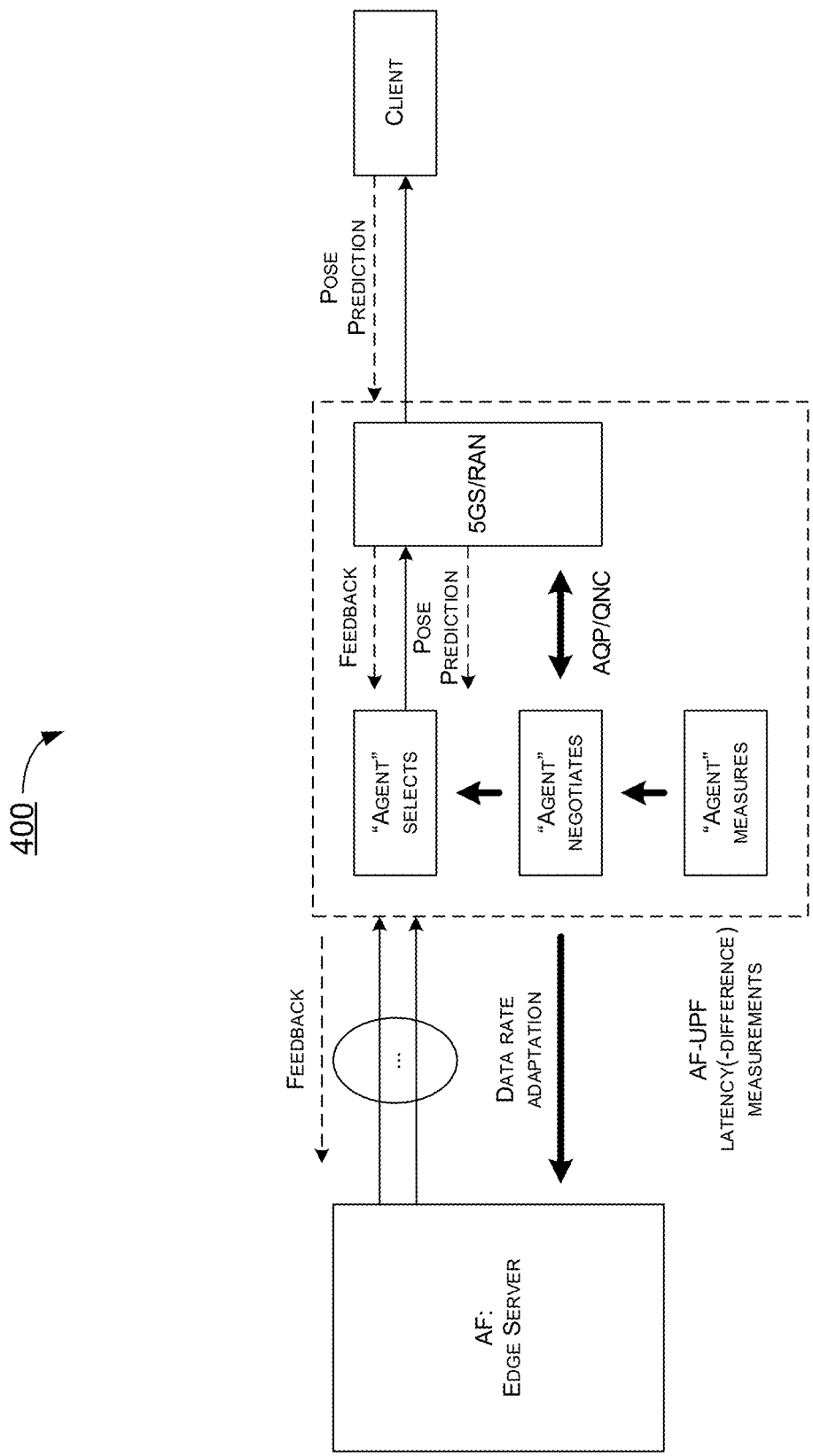
FIG. 4 is a diagram of an example scenario under a proposed scheme in accordance with the present disclosure.

FIG. 4 illustrates an example scenario 400 under a proposed scheme in accordance with the present disclosure with respect to on-congestion control and data rate adaptation. At present time, congestion control and QoS adaptation tend to be too slow to efficiently counter temporal variations of a network load, thereby leading to excessive margins in resource predictions. Under the proposed scheme, an agent per client may negotiate a 5QI adaptation (e.g., AQP/QNC) with a 5GS and may control data rate and latency adaptation as well as multi-layer multiplexing. The agent may receive inputs of measurements described above or even in the inputs of pose predictions (e.g., predictions of the pose of a user of UE 110, and variations in the pose, when using an XR application executed on UE 110). In other words, preferably, control may be placed close to the UPF 134 and/or SMF. Scenario 400 shows an example of measurement and adaptation application functions being placed close to the 5GS. Referring to FIG. 4, an agent function (or Agent) may perform operations such as selection, negotiation and measurement. For instance, the Agent may measure an AF-UPF latency between an AF and an UPF. The Agent may negotiate 5QI adaptation with the 5GS/RAN (e.g., RAN 120) for data rate adaptation as part of AQP/QNC, and the Agent may also select a data rate based on a result of the negotiation. In scenario 400, feedback of traffic latency may be provided to the Agent by the 5GS/RAN, and feedback of traffic latency may also be provided to the AF by the Agent. In addition, the Client (e.g., a client application executed on UE 110) may provide pose prediction to the 5GS/RAN, which in turn may provide the pose prediction to the Agent.

Figure 5:
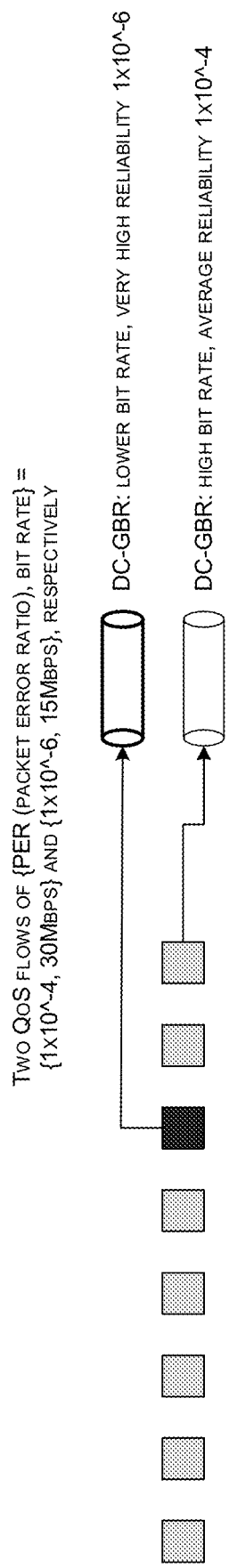
FIG. 5 is a diagram of an example scenario under a proposed scheme in accordance with the present disclosure.

FIG. 5 illustrates an example scenario 500 under a proposed scheme in accordance with the present disclosure with respect to differentiated reliability flows. Currently, error concealment requires distinction of reliability requirements. Under the proposed scheme, based on reliability distinctions of the traffics, separate QoS flows may be classified, categorized or otherwise divided into Critical, Basic, and Enhanced layers. Further distinctions based on PDB or combination(s) with multiplexing may also be feasible. For instance, the reliability requirement for an I-frame may be more critical than that of a P-frame because an error propagates spatially in I-frames, thereby spreading damage. In scenario 500, priority queues to support different reliability categories may be provided. For example, two QoS flows may be denoted as {packet error ratio, bit-rate}={$1\times10^{-4}$, 30 Mbps} and {$1\times10^{-6}$, 15 Mbps}, respectively. As shown in FIG. 5, one queue or flow may correspond to a first DC-GBR with a lower bit rate with a very high reliability (e.g., $1\times10^{-6}$) and another flow may correspond to a second DC-GBR with a higher bit rate with an average reliability (e.g., $1\times10^{-4}$).

Under the proposed scheme, layered or tiered encoding may involve encoding QoS flows of different priorities such as Enhanced priority, Basic priority, and Critical (or Protected) priority. That is, a QoS stream of Enhanced priority may be of the lowest priority (e.g., based on spatial, temporal, amplitude and/or frequency resolution). Moreover, a QoS stream of Basic priority may be of a medium priority, and a QoS stream of Critical (or Protected) priority may be of the highest priority. For instance, Web Real Time Communication (WebRTC) may provide an opportunity to game developers to indicate such high importance entities/areas (e.g., high complexity, scene transition, user focus and/or action). Accordingly, a slice header and/or motion vectors may not be dropped. As an example, three QoS flows of {packet error ratio, bit rate}={$1\times10^{-2}$, 20 Mbps}, {$1\times10^{-3}$, 10 Mbps} and {$1\times10^{-6}$, 1 Mbps}, respectively, may be separated as Enhanced, Basic and Critical (or Protected) flows, respectively.

Under a proposed scheme in accordance with the present disclosure with respect to traffic prioritization enhancements, a technique of advance transmission of packet descriptors may be utilized. Currently, packet-tagging (e.g., tagging of important packets) is considered to provide fine-level inputs to real-time scheduling. Real-time tag processing and scheduling, however, tends to add burden on a 5GS system. Under the proposed scheme, before encoding, predictions may be made on the content, size and header counter of media packets that will be transmitted by a server. Any information that would be conveyed through packet tagging may possibly be transmitted on a separate link to UPF/5GS ahead of media packets, instead of packet tagging. Similar technique may potentially be applied in the UL direction as well.

Illustrative Implementations

Figure 6:
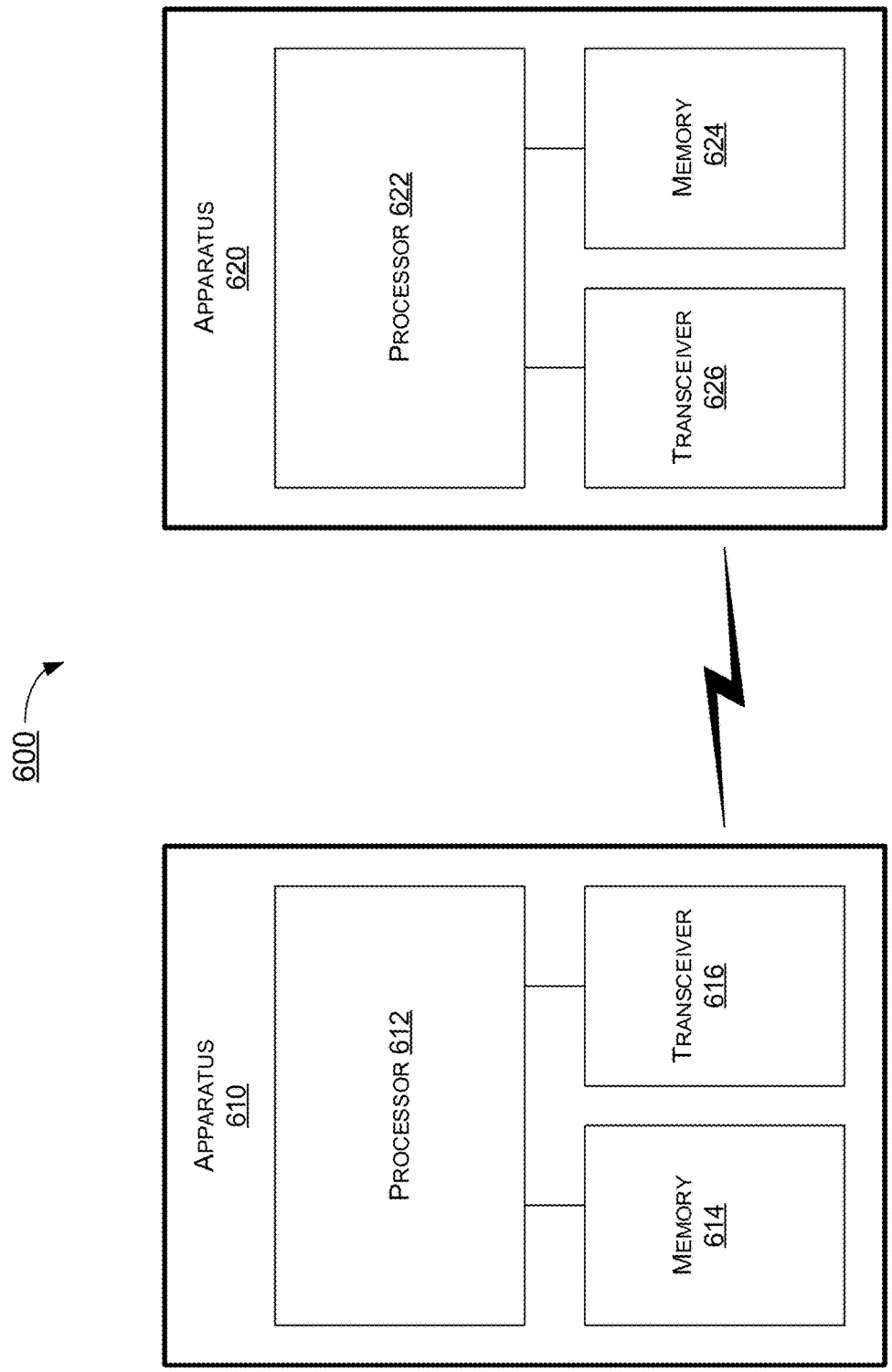
FIG. 6 is a block diagram of an example communication system in accordance with an implementation of the present disclosure.

FIG. 6 illustrates an example communication system 600 having at least an example apparatus 610 and an example apparatus 620 in accordance with an implementation of the present disclosure. Each of apparatus 610 and apparatus 620 may perform various functions to implement schemes, techniques, processes and methods described herein pertaining to cross-layer optimization for congestion control and traffic prioritization in RAN-aware XR and XR-aware RAN in mobile communications, including the various schemes described above with respect to various proposed designs, concepts, schemes, systems and methods described above, including network environment 100, as well as processes described below.

Each of apparatus 610 and apparatus 620 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 610 and apparatus 620 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 610 and apparatus 620 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 610 and apparatus 620 may be implemented in a smart thermostat, a smart fridge, a smart door lock, a wireless speaker or a home control center. When implemented in or as a network apparatus, apparatus 610 and/or apparatus 620 may be implemented in an eNodeB in an LTE, LTE-Advanced or LTE-Advanced Pro network or in a gNB or TRP in a 5G network, an NR network or an IoT network.

In some implementations, each of apparatus 610 and apparatus 620 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 610 and apparatus 620 may be implemented in or as a network apparatus or a UE. Each of apparatus 610 and apparatus 620 may include at least some of those components shown in FIG. 6 such as a processor 612 and a processor 622, respectively, for example. Each of apparatus 610 and apparatus 620 may further include one or more other components not pertinent to the proposed scheme of the present disclosure (e.g., internal power supply, display device and/or user interface device), and, thus, such component(s) of apparatus 610 and apparatus 620 are neither shown in FIG. 6 nor described below in the interest of simplicity and brevity.

In one aspect, each of processor 612 and processor 622 may be implemented in the form of one or more single-core processors, one or more multi-core processors, or one or more CISC or RISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks including those pertaining to cross-layer optimization for congestion control and traffic prioritization in RAN-aware XR and XR-aware RAN in mobile communications in accordance with various implementations of the present disclosure.

In some implementations, apparatus 610 may also include a transceiver 616 coupled to processor 612. Transceiver 616 may be capable of wirelessly transmitting and receiving data. In some implementations, transceiver 616 may be capable of wirelessly communicating with different types of wireless networks of different radio access technologies (RATs). In some implementations, transceiver 616 may be equipped with a plurality of antenna ports (not shown) such as, for example, four antenna ports. That is, transceiver 616 may be equipped with multiple transmit antennas and multiple receive antennas for multiple-input multiple-output (MIMO) wireless communications. In some implementations, apparatus 620 may also include a transceiver 626 coupled to processor 622. Transceiver 626 may include a transceiver capable of wirelessly transmitting and receiving data. In some implementations, transceiver 626 may be capable of wirelessly communicating with different types of UEs/wireless networks of different RATs. In some implementations, transceiver 626 may be equipped with a plurality of antenna ports (not shown) such as, for example, four antenna ports. That is, transceiver 626 may be equipped with multiple transmit antennas and multiple receive antennas for MIMO wireless communications.

In some implementations, apparatus 610 may further include a memory 614 coupled to processor 612 and capable of being accessed by processor 612 and storing data therein. In some implementations, apparatus 620 may further include a memory 624 coupled to processor 622 and capable of being accessed by processor 622 and storing data therein. Each of memory 614 and memory 624 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 614 and memory 624 may include a type of read-only memory (ROM) such as mask ROM, programmable ROM (PROM), erasable programmable ROM (EPROM) and/or electrically erasable programmable ROM (EEPROM). Alternatively, or additionally, each of memory 614 and memory 624 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 610 and apparatus 620 may be a communication entity capable of communicating with each other using various proposed schemes in accordance with the present disclosure. For illustrative purposes and without limitation, a description of capabilities of apparatus 610, as a UE (e.g., UE 110), and apparatus 620, as a network node (e.g., network node 125 or another network node implementing one or more network-side functionalities described above) of an application server side network (e.g., network 130 as a 5G/NR mobile network), is provided below.

Under various proposed schemes in accordance with the present disclosure pertaining to cross-layer optimization for congestion control and traffic prioritization in RAN-aware XR and XR-aware RAN in mobile communications, processor 622 of apparatus 620, implemented in or as a network node or server of an application server side network (e.g., network 130) implementing one or more network-side functionalities described above, may predict, based at least on a feedback of traffic latency, a congestion in a traffic between the application server side network and at least one UE (e.g., apparatus 610 as UE 110) of one or more UEs in RAN 120 of the application server side network based on a total RAN network load and traffics between the application server side network and the one or more UEs. Moreover, processor 622 may control, via transceiver 626, the congestion responsive to an increase in a queueing delay in the traffic between the application server side network and the at least one UE and an increase in a data rate and QoS parameters of the traffic. The traffic between the at least one UE and the application server side network may include an XR traffic associated with an XR client-side application executed on the at least one UE.

In some implementations, in predicting the congestion based at least on the feedback of traffic latency, processor 622 may predict the congestion based on the feedback of traffic latency plus a variation in a number of serviced links by the RAN, respective CSI and 5QI requirements, and actual throughputs.

In some implementations, in predicting the congestion, processor 622 may measure a delay between an AF (e.g., AF 132) and a UPF (e.g., UPF 134) of the application server side network in a DL direction.

In some implementations, in predicting the congestion, processor 622 may predict the congestion based on an advance transmission of packet descriptors. More specifically, in predicting the congestion based on the advance transmission of packet descriptors, processor 622 may, before encoding the traffics, predict a priority, size, and header counter of media packets transmitted over the traffics by a server of the application server side network, and any further information, which would be conveyed through packet tagging by header information, transmitted on a separate link to a UPF and a 5GS of the application server side network ahead of the media packets.

In some implementations, in controlling the congestion, processor 622 may split a media stream transmitted over a RAN (e.g., RAN 120) of the application server side network into multiple QoS flows according to reliability and latency requirements of stream constituents by the one or more UEs. In some implementations, in controlling the congestion, processor 622 may also extend a QoS adaptation mechanism of AQP and QNC to handling choices between bundles of simultaneous QoS flows among multiple media stream constituents. In some implementations, the QoS adaptation mechanism may involve utilizing a soft-real-time DC-DBR option that specifies reliability requirements of two flows of the simultaneous QoS flows by two pairs of {reliability, latency}.

In some implementations, in controlling the congestion, processor 622 may negotiate a 5QI adaptation of AQP and QNC with a 5GS to control data rate, latency adaptation, and multi-layer media multiplexing. Moreover, in predicting the congestion, processor 622 may receive, via transceiver 626, any or a combination of two or more of: (i) inputs of measurements of a delay between the AF and the UPF of the application server side network in the DL direction; (ii) inputs from the QNC or a separate mechanism by the RAN predicting congestion in the RAN based on an overall traffic; and (iii) inputs from the one or more UEs of a pose prediction associated with the XR client-side application. In some implementations, a single layer of a multi-layer media stream may be selected by the UPF for forwarding to the at least one UE based on QNC status or a most recent pose prediction input from the at least one UE. Moreover, the multi-layer media stream may include multiple media encoding layers of different resolutions or alternative layers conditioned on an evolution of UE inputs with respect to a user pose feedback of a location and an orientation.

In some implementations, in controlling the congestion, processor 622 may differentiate the traffics between the application server side network and the one or more UEs based on reliability distinctions of the traffics. In some implementations, in differentiating the traffics between the application server side network and the one or more UEs, processor 622 may separate multiple QoS flows associated with the one or more UEs into a plurality of layers based on reliability distinctions of the traffics. Furthermore, in separating the multiple QoS flows into the plurality of layers, processor 622 may separate the multiple QoS flows into a low-priority layer, a medium-priority layer, and a high-priority layer of different priority levels with respect to spatial, temporal, amplitude, and frequency resolutions, or with respect to an importance from a user experience or frame error concealment point of view. Moreover, in differentiating the traffics between the application server side network and the one or more UEs, processor 622 may separate the multiple QoS flows based on PDB distinctions of the traffics.

Illustrative Processes

Figure 7:
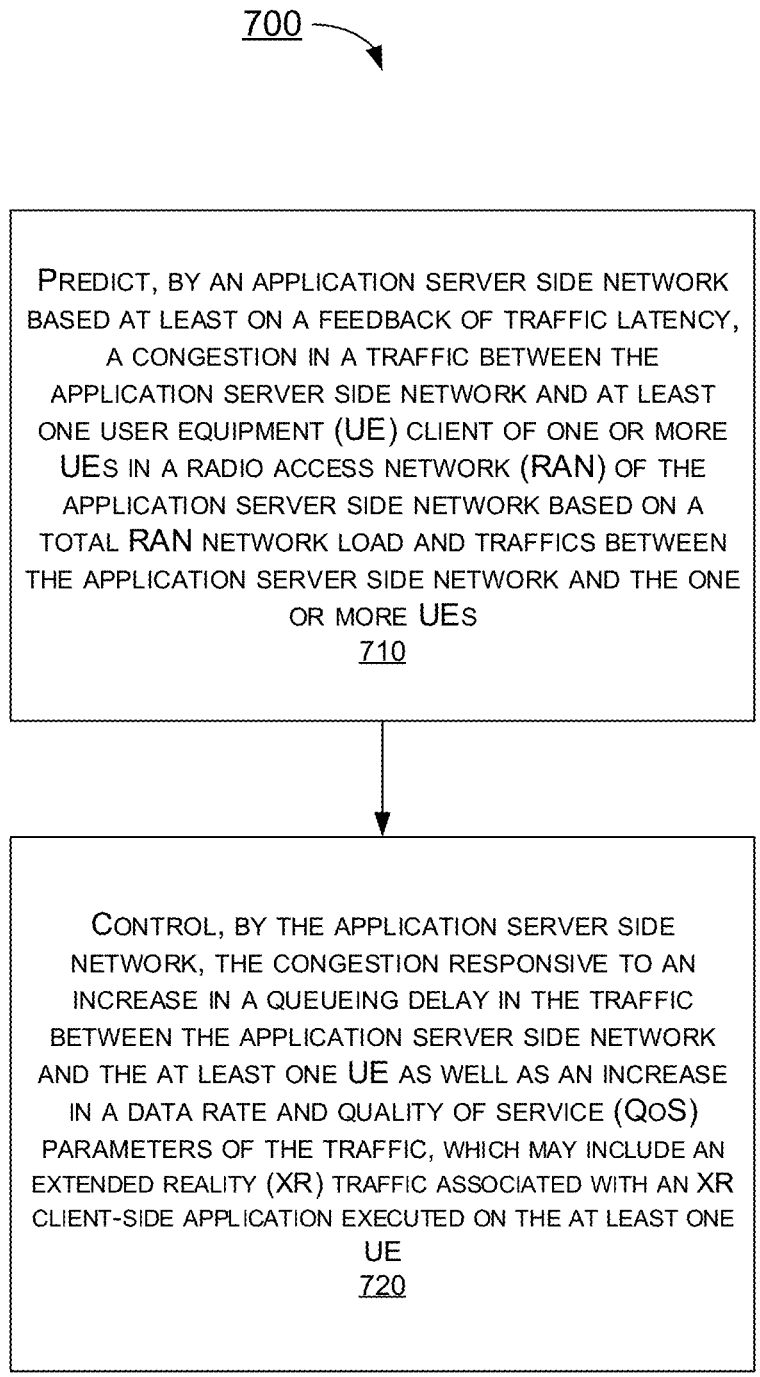
FIG. 7 is a flowchart of an example process in accordance with an implementation of the present disclosure.

FIG. 7 illustrates an example process 700 in accordance with an implementation of the present disclosure. Process 700 may represent an aspect of implementing various proposed designs, concepts, schemes, systems and methods described above, whether partially or entirely, including those pertaining to those described above. More specifically, process 700 may represent an aspect of the proposed concepts and schemes pertaining to cross-layer optimization for congestion control and traffic prioritization in RAN-aware XR and XR-aware RAN in mobile communications. Process 700 may include one or more operations, actions, or functions as illustrated by one or more of blocks 710 and 720. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively in a different order. Furthermore, one or more of the blocks/sub-blocks of process 700 may be executed iteratively. Process 700 may be implemented by or in apparatus 610 and apparatus 620 as well as any variations thereof. Solely for illustrative purposes and without limiting the scope, process 700 is described below in the context of apparatus 610 as a UE (e.g., UE 110) and apparatus 620 as a communication entity such as a network node or base station (e.g., network node 125 or another network node implementing one or more network-side functionalities described above) of an application server side network (e.g., network 130). Process 700 may begin at block 710.

At 710, process 700 may involve processor 622 of apparatus 620, implemented in or as a network node or server of an application server side network (e.g., network 130) implementing one or more network-side functionalities described above, predicting, based at least on a feedback of traffic latency, a congestion in a traffic between the application server side network and at least one UE (e.g., apparatus 610 as UE 110) of one or more UEs in RAN 120 of the application server side network based on a total RAN network load and traffics between the application server side network and the one or more UEs. Process 700 may proceed from 710 to 720.

At 720, process 700 may involve processor 622 controlling, via transceiver 626, the congestion responsive to an increase in a queueing delay in the traffic between the application server side network and the at least one UE as well as an increase in a data rate and QoS parameters of the traffic. The traffic between the at least one UE and the application server side network may include an XR traffic associated with an XR client-side application executed on the at least one UE.

In some implementations, in predicting the congestion based at least on the feedback of traffic latency, process 700 may involve processor 622 predicting the congestion based on the feedback of traffic latency plus a variation in a number of serviced links by the RAN, respective CSI and 5QI requirements, and actual throughputs.

In some implementations, in predicting the congestion, process 700 may involve processor 622 measuring a delay between an AF (e.g., AF 132) and a UPF (e.g., UPF 134) of the application server side network in a DL direction.

In some implementations, in predicting the congestion, process 700 may involve processor 622 predicting the congestion based on an advance transmission of packet descriptors. More specifically, in predicting the congestion based on the advance transmission of packet descriptors, process 700 may involve processor 622, before encoding the traffics, predicting a priority, size, and header counter of media packets transmitted over the traffics by a server of the application server side network, and any further information, which would be conveyed through packet tagging by header information, transmitted on a separate link to a UPF and a 5GS of the application server side network ahead of the media packets.

In some implementations, in controlling the congestion, process 700 may involve processor 622 splitting a media stream transmitted over a RAN (e.g., RAN 120) of the application server side network into multiple QoS flows according to reliability and latency requirements of stream constituents by the one or more UEs. In some implementations, in controlling the congestion, process 700 may further involve processor 622 extending a QoS adaptation mechanism of AQP and QNC to handling choices between bundles of simultaneous QoS flows among multiple media stream constituents. In some implementations, the QoS adaptation mechanism may involve utilizing a soft-real-time DC-DBR option that specifies reliability requirements of two flows of the simultaneous QoS flows by two pairs of {reliability, latency}.

In some implementations, in controlling the congestion, process 700 may involve processor 622 negotiating a 5QI adaptation of AQP and QNC with a 5GS to control data rate, latency adaptation, and multi-layer media multiplexing. Moreover, in predicting the congestion, process 700 may involve processor 622 receiving, via transceiver 626, any or a combination of two or more of: (i) inputs of measurements of a delay between the AF and the UPF of the application server side network in the DL direction; (ii) inputs from the QNC or a separate mechanism by the RAN predicting congestion in the RAN based on an overall traffic; and (iii) inputs from the one or more UEs of a pose prediction associated with the XR client-side application. In some implementations, a single layer of a multi-layer media stream may be selected by the UPF for forwarding to the at least one UE based on QNC status or a most recent pose prediction input from the at least one UE. Moreover, the multi-layer media stream may include multiple media encoding layers of different resolutions or alternative layers conditioned on an evolution of UE inputs with respect to a user pose feedback of a location and an orientation.

In some implementations, in controlling the congestion, process 700 may involve processor 622 differentiating the traffics between the application server side network and the one or more UEs based on reliability distinctions of the traffics. In some implementations, in differentiating the traffics between the application server side network and the one or more UEs, process 700 may involve processor 622 separating multiple QoS flows associated with the one or more UEs into a plurality of layers based on reliability distinctions of the traffics. Furthermore, in separating the multiple QoS flows associated into the plurality of layers, process 700 may involve processor 622 separating the multiple QoS flows into a low-priority layer, a medium-priority layer, and a high-priority layer of different priority levels with respect to spatial, temporal, amplitude, and frequency resolutions, or with respect to an importance from a user experience or frame error concealment point of view. Moreover, in differentiating the traffics between the network and the one or more UEs, process 700 may involve processor 622 separating the multiple QoS flows based on PDB distinctions of the traffics.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
predicting, by an application server side network based at least on a feedback of traffic latency, a congestion in a traffic between the application server side network and at least one user equipment (UE) of one or more UEs in a radio access network (RAN) of the application server side network based on a total RAN network load and traffics between the application server side network and the one or more UEs; and
controlling, by the application server side network, the congestion responsive to an increase in a queueing delay in the traffic between the application server side network and the at least one UE and an increase in a data rate and quality of service (QOS) parameters of the traffic,
wherein the traffic between the at least one UE and the application server side network comprises an extended reality (XR) traffic associated with an XR client-side application executed on the at least one UE.

2. The method of claim 1, wherein the predicting of the congestion based at least on the feedback of traffic latency comprises predicting the congestion based on the feedback of traffic latency plus a variation in a number of serviced links by the RAN, respective channel state information (CSI) and 5$^{th}$ Generation QoS identifier (5QI) requirements, and actual throughputs.

3. The method of claim 1, wherein the predicting of the congestion comprises measuring a delay between an Application Function (AF) and a User Plane Function (UPF) of the application server side network in a downlink (DL) direction.

4. The method of claim 1, wherein the controlling of the congestion comprises splitting a media stream transmitted over the RAN of the application server side network into multiple QoS flows according to reliability and latency requirements of stream constituents by the one or more UEs.

5. The method of claim 4, wherein the controlling of the congestion further comprises extending a QoS adaptation mechanism of Adaptive QoS Policy (AQP) and QoS Notification Control (QNC) to handling choices between bundles of simultaneous QoS flows among multiple media stream constituents.

6. The method of claim 5, wherein the QoS adaptation mechanism involves utilizing a soft-real-time delay constrained data bearer (DC-DBR) option that specifies reliability requirements of two flows of the simultaneous QoS flows by two pairs of {reliability, latency}.

7. The method of claim 1, wherein the controlling of the congestion comprises negotiating a 5$^{th}$ Generation QoS identifier (5QI) adaptation of Adaptive QoS Policy (AQP) and QOS Notification Control (QNC) with a 5$^{th}$ Generation System (5GS) to control data rate, latency adaptation, and multi-layer media multiplexing.

8. The method of claim 7, wherein the predicting of the congestion comprises:
receiving any or a combination of:
inputs of measurements of a delay between an Application Function (AF) and a User Plane Function (UPF) of the application server side network in a downlink (DL) direction;
inputs from the QNC or a separate mechanism by the RAN predicting congestion in the RAN based on an overall traffic; and
inputs from the one or more UEs of a pose prediction associated with the XR client-side application.

9. The method of claim 8, wherein a single layer of a multi-layer media stream is selected by the UPF for forwarding to the at least one UE based on QNC status or a most recent pose prediction input from the at least one UE, and wherein the multi-layer media stream comprises multiple media encoding layers of different resolutions or alternative layers conditioned on an evolution of UE inputs with respect to a user pose feedback of a location and an orientation.

10. The method of claim 1, wherein the controlling of the congestion comprises differentiating the traffics between the application server side network and the one or more UEs based on reliability distinctions of the traffics, and wherein the differentiating of the traffics between the application server side network and the one or more UEs comprises separating multiple QoS flows associated with the one or more UEs into a plurality of layers based on reliability distinctions of the traffics.

11. The method of claim 10, wherein the separating of the multiple QoS flows into the plurality of layers comprises separating the multiple QoS flows into a low-priority layer, a medium-priority layer, and a high-priority layer of different priority levels with respect to spatial, temporal, amplitude, and frequency resolutions, or with respect to an importance from a user experience or frame error concealment point of view.

12. The method of claim 10, wherein the differentiating of the traffics between the application server side network and the one or more UEs further comprises separating the multiple QoS flows based on packet delay budget (PDB) distinctions of the traffics.

13. The method of claim 1, wherein the predicting of the congestion comprises predicting the congestion based on an advance transmission of packet descriptors.

14. The method of claim 13, wherein the predicting of the congestion based on the advance transmission of packet descriptors comprises, before encoding the traffics, predicting a priority, size, and header counter of media packets transmitted over the traffics by a server of the application server side network, and any further information, which would be conveyed through packet tagging by header information, transmitted on a separate link to a User Plane Function (UPF) and a 5$^{th}$ Generation System (5GS) of the application server side network ahead of the media packets.

15. An apparatus implementable in an application server side network, comprising:
  a transceiver configured to communicate with one or more network nodes of the network; and
  a processor coupled to the transceiver and configured to perform operations comprising:
    predicting, based at least on a feedback of traffic latency, a congestion in a traffic between the application server side network and at least one user equipment (UE) of one or more UEs in a radio access network (RAN) of the application server side network based on a total RAN network load and traffics between the application server side network and the one or more UEs; and
    controlling, via the transceiver, the congestion responsive to an increase in a queueing delay in the traffic between the application server side network and the at least one UE and an increase in a data rate and quality of service (QOS) parameters of the traffic,
  wherein the traffic between the at least one UE and the application server side network comprises an extended reality (XR) traffic associated with an XR client-side application executed on the at least one UE.

16. The apparatus of claim 15, wherein, in predicting the congestion, the processor is configured to measure a delay between an Application Function (AF) and a User Plane Function (UPF) of the application server side network in a downlink (DL) direction.

17. The apparatus of claim 15, wherein, in controlling the congestion, the processor is configured to perform operations comprising:
  splitting a media stream transmitted over the RAN of the application server side network into multiple QoS flows according to reliability and latency requirements of stream constituents by the one or more UEs; and
  extending a QoS adaptation mechanism of Adaptive QoS Policy (AQP) and QoS Notification Control (QNC) to handling choices between bundles of simultaneous QoS flows among multiple media stream constituents.

18. The apparatus of claim 15, wherein, in controlling the congestion, the processor is configured to negotiate a 5$^{th}$ Generation QoS identifier (5QI) adaptation of Adaptive QoS Policy (AQP) and QoS Notification Control (QNC) with a 5$^{th}$ Generation System (5GS) to control data rate, latency adaptation, and multi-layer media multiplexing.

19. The apparatus of claim 15, wherein, in controlling the congestion, the processor is configured to differentiate the traffics between the application server side network and the one or more UEs based on reliability distinctions of the traffics, and wherein, in differentiating the traffics between the application server side network and the one or more UEs, the processor is configured to separate multiple QoS flows associated with the one or more UEs into a plurality of layers based on reliability distinctions of the traffics.

20. The apparatus of claim 15, wherein, in predicting the congestion, the processor is configured to predict the congestion based on an advance transmission of packet descriptors.

* * * * *